United States Patent [19]

Cooper

[11] 4,213,176

[45] Jul. 15, 1980

[54] SYSTEM AND METHOD FOR INCREASING THE OUTPUT DATA THROUGHPUT OF A COMPUTER

[75] Inventor: Paul J. Cooper, Acton, Mass.

[73] Assignee: NCR Corporation, Dayton, Ohio

[21] Appl. No.: 753,398

[22] Filed: Dec. 22, 1976

[51] Int. Cl.² .............................................. G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,558,811 | 1/1971 | Montevecchio et al. | 364/900 |
| 3,891,971 | 6/1975 | Hirvela et al. | 364/900 |
| 3,909,790 | 9/1975 | Shapiro et al. | 364/200 |
| 3,924,240 | 12/1975 | Given | 364/200 |
| 3,938,098 | 2/1976 | Garlic | 364/200 |
| 3,990,049 | 11/1976 | Wirth | 364/900 |
| 4,017,841 | 4/1977 | Jensen | 364/900 |

Primary Examiner—Leo H. Boudreau

Attorney, Agent, or Firm—J. T. Cavender; Albert L. Sessler, Jr.; Elmer Wargo

[57] ABSTRACT

A circuit and method for increasing the output data per unit time from a computer to its associated peripheral terminals or utilization devices is disclosed in which the computer output address and data lines are time multiplexed by a novel decoding technique which enables the address bits and data bits to be interpreted together to form a new data word having a number of bits equal to the sum of the original data bits and the address bits interpreted as data bits. A plurality of decoders, each at a peripheral terminal and each having an identification address code, enable a window for decoding multiple transfers of data on output address and data lines, said window having a predetermined time duration during which all other peripheral identification address codes are locked out, until the data transfer is completed.

A microprocessor embodying the invention is also disclosed in which the output data capability is increased from eight to sixteen bits without hardware modification to the microprocessor.

14 Claims, 5 Drawing Figures

FIG. 4

| MEMORY LOCATION | DESCRIPTION | HEX NOTATION |
|---|---|---|
| XX00 | LOAD ACCUMULATOR | 3E' |
| XX01 | COUNT STORED (NO. OF WORDS) | <B$_2$> |
| XX02 | OUTPUT | D3' |
| XX03 | DEVICE ID STORED | <B$_2$> |
| | | |
| XX04 | LOAD ACCUMULATOR | 3E' |
| XX05 | FIRST DATA BYTE | * |
| XX06 | OUTPUT | D3' |
| XX07 | SECOND DATA BYTE | * |
| | | |
| XX08 | LOAD ACCUMULATOR | 3E' |
| XX09 | THIRD DATA BYTE | * |
| XX0A | OUTPUT | D3' |
| XX0B | FOURTH DATA BYTE | * |
| | | |
| XX0C | LOAD ACCUMULATOR | 3E' |
| XX0D | FIFTH DATA BYTE | * |
| XX0E | OUTPUT | D3' |
| XX0F | SIXTH DATA BYTE | * |
| | | |
| X100 | RETURN TO CALLER OR SYSTEM SOFTWARE | C9' |

\* REPRESENTS AN 8 BIT BYTE TO BE TRANSFERRED TO A PERIPHERAL

' REPRESENTS 8080 INSTRUCTIONS (OPERATION CODES)

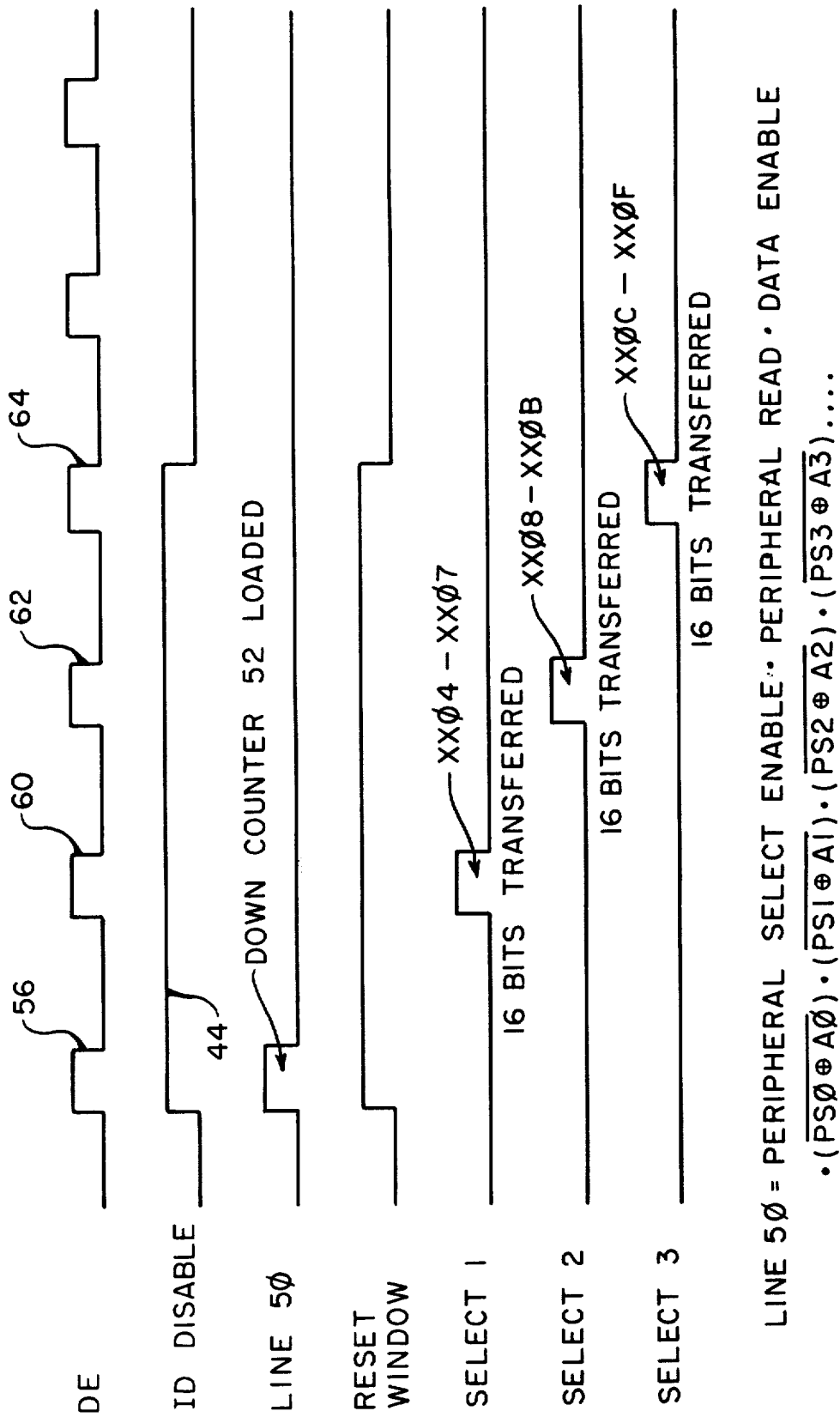

SYSTEM AND METHOD FOR INCREASING THE OUTPUT DATA THROUGHPUT OF A COMPUTER

BACKGROUND OF THE INVENTION

1. Field of the Invention

The present invention relates generally to data processing systems and more particularly to increasing the data throughput between a controller, such as a microprocessor and its associated peripheral equipment in a multi-terminal configuration. The invention also relates to a decoding method for time multiplexing the address and data outputs of a microprocessor to increase the data output capability of the microprocessor by increasing the data bit word length.

2. Description of the Prior Art

Many techniques exist in prior art real time digital communications systems in which a central processor performs operations on digital data coupled thereto from peripheral equipment at varying data rates. Such systems may, once communication is established, be automatically terminated once the data is completely transmitted or received, without, however, varying bit-length of the transmitted data words. Such a system is disclosed by U.S. Pat. No. 3,251,040.

It is also recognized by the prior art that the number of words available in the main high speed memory of a computer may be effectively increased by dividing the main memory into sections such that the instruction field may, under certain conditions, be loaded into the data field. One such system, in which the word width is increased, but the transfer rate is not, is described by U.S. Pat. No. 3,786,436.

The concept of accessing a microprocessor memory via a single channel for both data and microinstructions is described by U.S. Pat. No. 3,828,320, in which two discrete channels, one for data and one for address, are multiplexed synchronously to a shared memory to enable the storage to be allocated as data or microinstruction storage. While memory capacity is effectively increased, the data throughput capability remains constant. The interleaving of memory in a computer to maximize memory utilization is also well known, and is disclosed by U.S. Pat. Nos. 3,883,854 and 3,866,180. Additionally, U.S. Pat. No. 3,859,636 describes a technique for directly executing instructions coded in a microprogram instruction code format and stored in the main memory of a microprogram controlled microprocessor. In none of the above-described patents is the data output rate increased by time-multiplexing the output address and data lines of a data processor to increase the data word length decoded therefrom.

SUMMARY OF THE INVENTION

This invention relates to a system including a circuit means and a method for increasing the output data of a processor to a plurality of utilization devices like peripherals. The circuit means includes means for storing data words and a count of the data words to be transferred to a selected one of the utilization devices, means for selecting one of the utilization devices and for disabling the remaining non-selected utilization devices for a predetermined time interval, and means for receiving the data words which are transferred over the associated address lines and data lines to the selected utilization device. By using the circuit means of this invention data bits which are normally sent to the selected utilization device over only the data lines are also sent to the selected utilization device over the address lines to increase the transmitting or outputting of data to the selected utilization device during the predetermined time interval or window which ends upon the completion of the count of data words transferred to the selected utilization device.

BRIEF DESCRIPTION OF THE DRAWINGS

FIG. 4 is a program listing for the outputting of data; and

FIG. 5 is a timing diagram for the microprocessor.

DESCRIPTION OF THE PREFERRED EMBODIMENT

Figure 1:
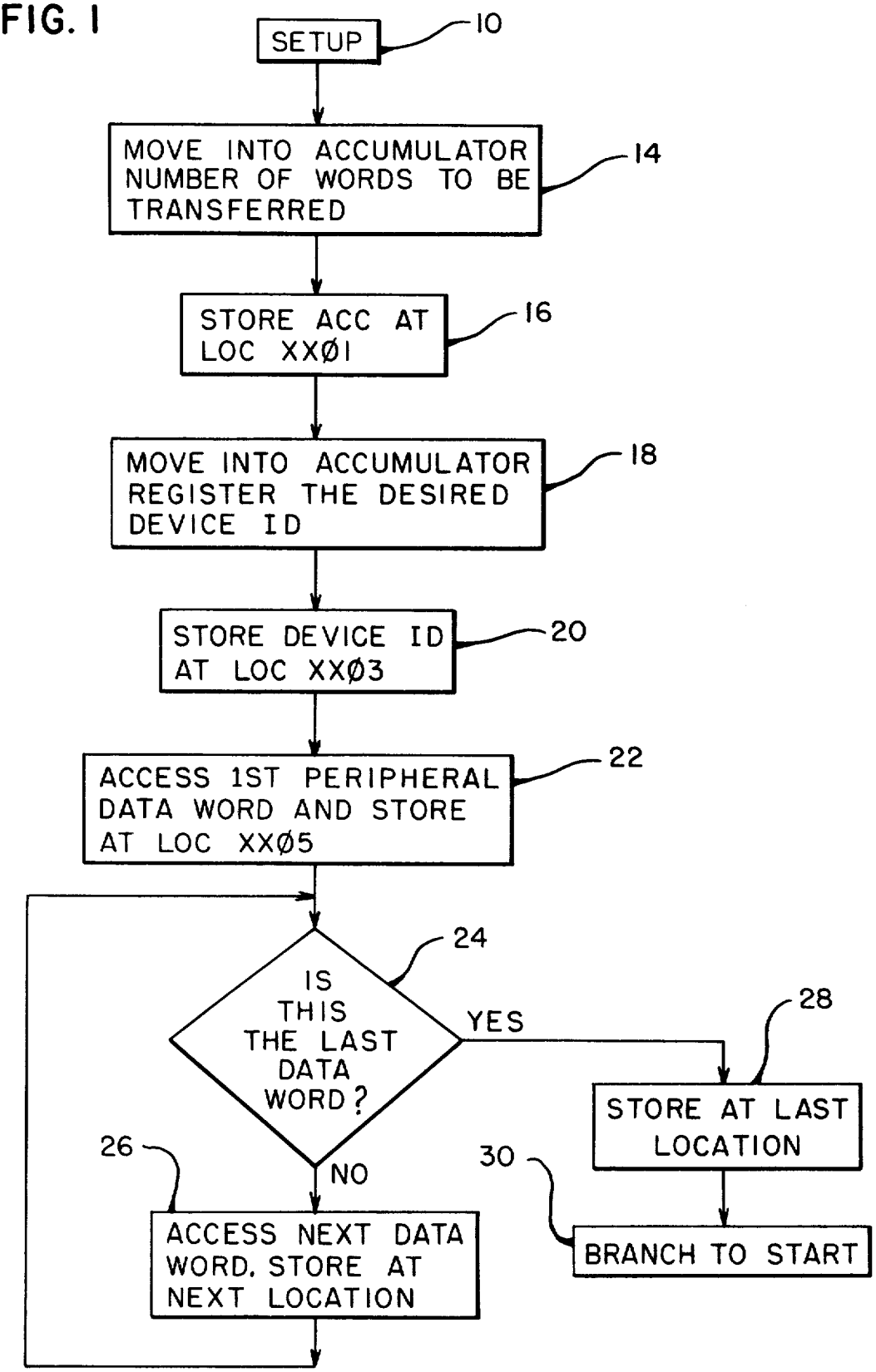
FIG. 1 is a diagram showing an initialization routine for generating the necessary software (data format) for outputting data from a microprocessor.

As previously discussed, it is advantageous to maximize the data word output of a computer without unduly increasing the memory requirements. While the present invention is disclosed in connection with a particular computer, an 8-bit microprocessor such as the "8080" manufactured by Intel Corp., it is to be understood that the invention is generally applicable to other microprocessors, minicomputers and other data processing equipment in which increased throughput capability is required. Generally, MOS microprocessors such as Intel 8080 have relatively low data rates, typically 100,000 transfers per second, which limit the number of peripherals which can be interfaced to such a microprocessor based controller.

In accordance with the teaching of the present invention, an eight-bit-wide, data-output-byte-capability microprocessor can function as a sixteen-bit wide data output word machine, by interpreting eight-bits of address as data to form a sixteen-bit word. As used herein, 8 bits equal 1 byte or ½ word, and 2 bytes equal 1 word. In this described example, for each output function, two data bytes rather than one are obtained. To accomplish the foregoing, a novel decoder circuit selects the address identification code (ID) of a particular peripheral to enable a "window" in time or predetermined time interval to allow multiple transfer of data on address and data lines, while locking out the other peripherals from accepting data during the window period, until the data transfer is completed, at which time the window is automatically reset to enable the next transfer. The number or the count of data words to be transmitted, is transmitted within the first transfer, thereby enabling the window for a time duration which is equal to the time required to transmit the number of words to be transferred. The decoder logic includes essentially a digital counter, which once enabled, keeps track of the window-end-time by down-counting to zero, at which time, other peripheral ID's are no longer locked out of the system and the window is effectively closed. The aforementioned technique requires that once the window is opened, the data transfer from the microprocessor to the selected peripheral must be continuous.

Before proceeding with a detailed explanation of this invention, it appears useful to discuss a specific example which will illustrate some advantages of this invention. An Intel 8080 microprocessor was selected to illustrate this invention; however, the principles thereof may be extended to other processors. Reference may be had to "The Intel 8080 Microcomputer System Manual", January 1975, published by Intel Corporation and "The Bugbook III", Peter R. Rony and David G. Larsen, 1975, published by Southern Printing, for a more detailed explanation of the 8080 microprocessor, which said publications are incorporated herein by reference.

When using an Intel 8080 microprocessor for controlling a plurality of utilization devices such as peripherals, the usual or prior art method would be to load the accumulator of the microprocessor with the required data and output the data to the selected peripheral whose identification (ID) would be decoded from the address lines. The technique is accomplished by the following program steps:

Example (1)

| Program Steps or Memory Address | Description | Hex Code | Octal Code |
|---|---|---|---|
| (1) | *Load Accumulator | 3E | $\phi 76$ |
| (2) | $<B_2>$ | | |
| (3) | *Out | D3 | 323 |
| (4) | $<B_2>$ | | |
| (5) | *Load Accumulator | 3E | $\phi 76$ |
| (6) | $<B_2>$ | | |
| (7) | *Out | D3 | 323 |
| (8) | $<B_2>$ | | |

(* = An Instruction)

In the above Example 1, the first sequence of program steps 1–4 does the following. Program step (1) loads the accumulator with the data $<B_2>$ (step 2). The data is then output or sent over the output data lines of the microprocessor to the peripheral whose identification (ID) is $<B_2>$ (step 4). Because the 8080 processor is an eight-bit processor, the total number of bits of data which is sent to the selected peripheral by the first sequence of program steps 1–4 is 8 or ½ of a word as used herein. This sequence of steps is repeated in program steps 5–8 to output another eight-bit byte to the selected peripheral, making a total of sixteen bits or 1 word (as used herein) which is transferred by the microprocessor to the selected peripheral in program steps 1–8. Program steps 5–8 are an exact repetition of program steps 1–4.

Under the present invention, the count or number of words (each word being equal to 2 eight-bit bytes) to be transferred to the output device or peripheral is determined, and the ID of the peripherals is selected to enable a "window" to allow multiple transfers of data to the peripheral in one transfer sequence. This "window" is reset when the transfer is completed. The following example will make this technique clearer.

Example (2)

| Program Steps | Description | Hex Code | Octal Code |
|---|---|---|---|
| (1) | Load Accumulator | 3E | $\phi 76$ |
| (2) | *$<B_2>$ Count Stored (Number of 16-bit Words) | | |
| (3) | Out | D3 | 323 |
| (4) | **$<B_2>$ Device (ID) | | |
| (5) | Load Accumulator | 3E | $\phi 76$ |
| (6) | $<B_2>$ First data byte | | |
| (7) | Out | D3 | 323 |
| (8) | $<B_2>$ Second data | | |

Example (2)-continued

| Program Steps | Description | Hex Code | Octal Code |
|---|---|---|---|
| | byte | | |

(*)8 bits implies 1 to 255 words may be selected by a hexadecimal value from $\phi 1$ to FF; $\phi\phi$(HEX) implies no word transfer.

(**)This is the preset ID code hardwired on a printed circuit board for a peripheral and matches one of the available peripheral enable selection codes (to be later described herein).

From the first sequence of steps 1–4 in Example 2, the count or number of words (each word equals 2 eight-bit bytes) to be transferred, and the device ID are outputted to enable the "window" alluded to earlier herein, to allow the multiple transfers of data enumerated in the second sequence of steps 5–8 in Example 2. Note that in step 8 of Example 2, that which would normally be an address in Example 1, is actually data in Example 2. Thus, for the same number of program steps 1–8 in Examples 1 and 2, the same amount of data (16 bits or 2 eight-bit data bytes) is transferred; however, 16 bits of data represents the break-even point between the two systems exemplified by Examples 1 and 2. When 24 bits of data or more must be transferred, the system of the present invention (as exemplified in Example 2) becomes advantageous. For example, if 32 bits of data were to be sent to a peripheral using the techniques of Example 1, a third and fourth sequence of steps similar to steps 1–4 or 5–8 would be noted. Under the teaching of the present invention, however, only one additional sequence, similar to the sequence of steps 5–8 of Example 2, would be needed, i.e., the first four steps would indicate the count i.e., 2 words, (with each word being equal to 2 eight-bit-bytes) and the peripheral ID, and steps 5–8 would transfer 16 bits of data, and similarly steps 9–12 (not shown but similar to steps 5–8) would also transfer 16 bits of data. Thus, under Example 1, 4 sequences similar to steps 1–4 are required to transfer 32 bits of data, whereas under Example 2, only 3 sequences are required. Or stated another way, 4 sequences under Example 2 will transfer 48 bits of data whereas the four sequences under Example 1 will transfer only 32 bits of data. Thus, for the same number of sequences, (4), the technique under Example 1 will output 32 bits of data whereas under 4 sequences of Example 2, 48 bits of data will be transferred; this represents a 50% increase in the output of data bits by the technique of Example 2 over the technique of Example 1.

The transfer of data as exemplified by Example 2 is used only for outputting data under this invention, and once the "window" or predetermined time interval is opened, the data to be transferred to the selected peripheral must be contiguous. That is, all peripherals or output devices other than the selected peripheral are disabled until the transfer of all data is completed to the selected peripheral. The word count which is initially transferred is used to keep track of the ending of the "window" by counting down on a counter each time a data transfer is made to thereby automatically signify the end of the "window". Thereafter, the microprocessor can continue with routine processing.

This increase in bit count which is obtained by the technique of Example 2 is of extreme importance where time is of extreme importance, and the application for which a microprocessor is needed does not justify the use of a 16-bit microprocessor but an eight-bit processor is not quite fast enough.

To explain the invention in more detail, FIG. 1 represents a complete initialization routine whereby the necessary software (data format) for the outputting of data is generated. A first step 10 includes a general step up for exercising the hardware associated with a computer system 48 shown in FIG. 3 and for determining the count or number of words to be transferred to an output device like a peripheral. Continuing with the examples given in Examples 1 and 2 described earlier herein, the count or number of words to be transferred to a peripheral corresponds to the number of words (as previously defined), and the number of words is conventionally determined by system software associated with the computer system 48. The count or number of words so determined is moved into the accumulator of the microprocessor 12 (FIG. 3) as indicated by step 14 (FIG. 1) and is then stored in a memory location $XX\phi1$ as indicated by step 16 (FIG. 1). The "X"s in the memory locations represent "don't-care" data bits, and the values for the memory locations are given in hexadecimal form. The identification code or ID of the utilization device, or peripheral to which the data is to be outputted, is then moved into the accumulator of the microprocessor 12 (step 18 of FIG. 1) and is then stored at memory location $XX\phi3$ as indicated by step 20. The particular ID for the selected utilization device is conventionally determined by the system software associated with the computer system 48. Step 22 in FIG. 1 is ascertained indirectly from the operational system software (as in step 10 of FIG. 1); this data was generated earlier and is accessed from some portion of memory where it was stored in step 10. Step 22 corresponds to step $XX\phi5$ in FIG. 5. Step 24 (FIG. 1) is a decision making step which determines whether or not the full count of words of data to be transferred is met. If not, the next data word is accessed in step 26 and stored in the next memory location. For example, the second data byte is stored at memory location $XX\phi7$ (FIG. 4). This cycle is repeated at steps 24, 26 until the last data word is received (as determined by the count or number of words to be transferred from step 14 in FIG. 1), and the last data word is stored at the last memory location in step 28; this last word corresponds to memory location $XX\phi F$ in FIG. 4. Thereafter the program branches or returns to start as shown in step 30 in FIG. 1 and memory location $XX\phi\phi$ shown in FIG. 4.

FIG. 4 shows the specific memory locations and machine code instructions, in both mnemonic form and hex code, for the Intel 8080 microprocessor. It should be noted that the data stored in memory location $XX\phi7$ in FIG. 4, for example, would normally be considered an output device ID ie., address data; however, as used herein, the data is "raw data" which will be transferred to the output device whose address is stored at memory location XX03 in FIG. 4 by the process of outputting data shown in FIG. 2. The steps identified by memory locations XX08 through $XX\phi B$ and the steps identified by memory locations $XX\phi C$ through $XX\phi F$ shown in FIG. 4 are just repetitions of the basic steps $XX\phi4$ through $XX\phi7$ shown therein.

Figure 2:
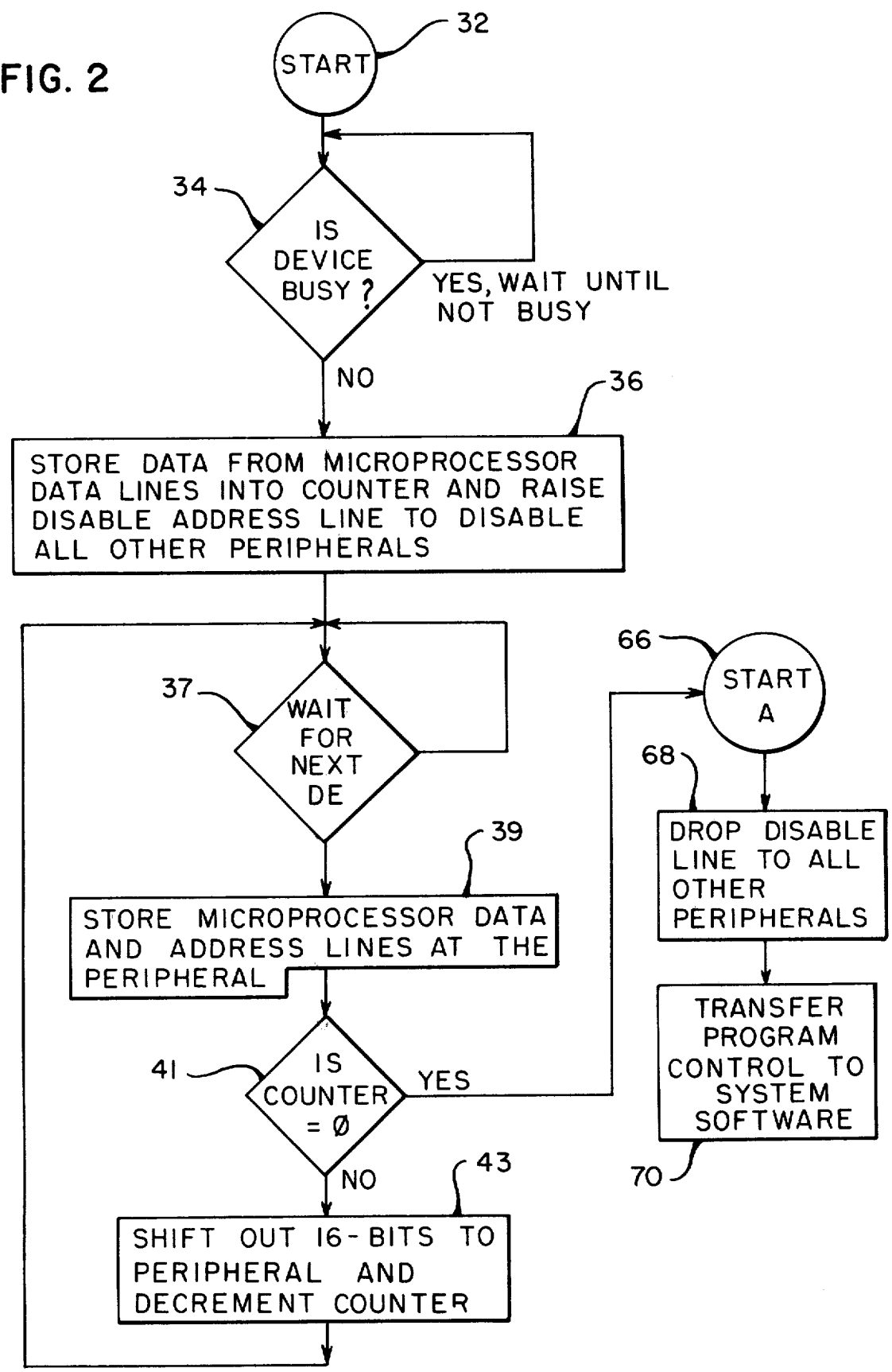
FIG. 2 is a diagram showing the flow of data from the microprocessor to a peripheral.

The start step 32 in FIG. 2 is a symbolic representation of software for outputting data. When data is to be outputted to a particular output device or peripheral, the device is conventionally polled to determine whether or not it is busy as shown by step 34 in FIG. 2. If the selected device is busy, the microprocessor 12 may go into an idle state or proceed with some other activity not associated with peripheral communications (not shown). When the output device is again polled and is not found busy in step 34, the execution phase of outputting the data to the output device begins at step 36 (FIG. 2). During this time, the microprocessor 12 executes the steps shown by the memory locations $XX\phi\phi$ through $XX\phi3$ (FIG. 4). During step 36, the output device ID which was stored at memory location $XX\phi3$ is fed over the address lines 38 to a buffered ID decoder logic 40 shown in FIG. 3. The memory location $XX\phi3$ of FIG. 4 contains a special code along with the ID of the selected output device which enables the outputting from the microprocessor 12 to go into the special outputting mode like Example 2 (cited earlier herein) instead of the regular outputting mode as shown in Example 1 cited earlier herein. A pre-set code ($XX\phi3$ in FIG. 4) on a printed circuit board 42 (FIG. 3), associated with the decoder logic 40, is used to indicate when the special outputting mode is to be initiated. When the special code in memory location $XX\phi3$ of FIG. 4 matches the pre-set code on the printed circuit board 42, the decoder logic 40 outputs or raises a master disable line 44 to the non-selected ID peripherals like ID2, ID3 etc., and also outputs or raises a line 46 to the computer system 48 of which the microprocessor 12 is a part. Once the line 46 is raised, the microprocessor 12 becomes dedicated, and it cannot be interrupted until the transfer of data is complete; in the example given in FIG. 4, this means that the steps represented by memory locations $XX\phi3$ through $X1\phi\phi$ must be completed without interruption. Thereafter, the microprocessor 12 can continue with its routine operations.

Figure 3:
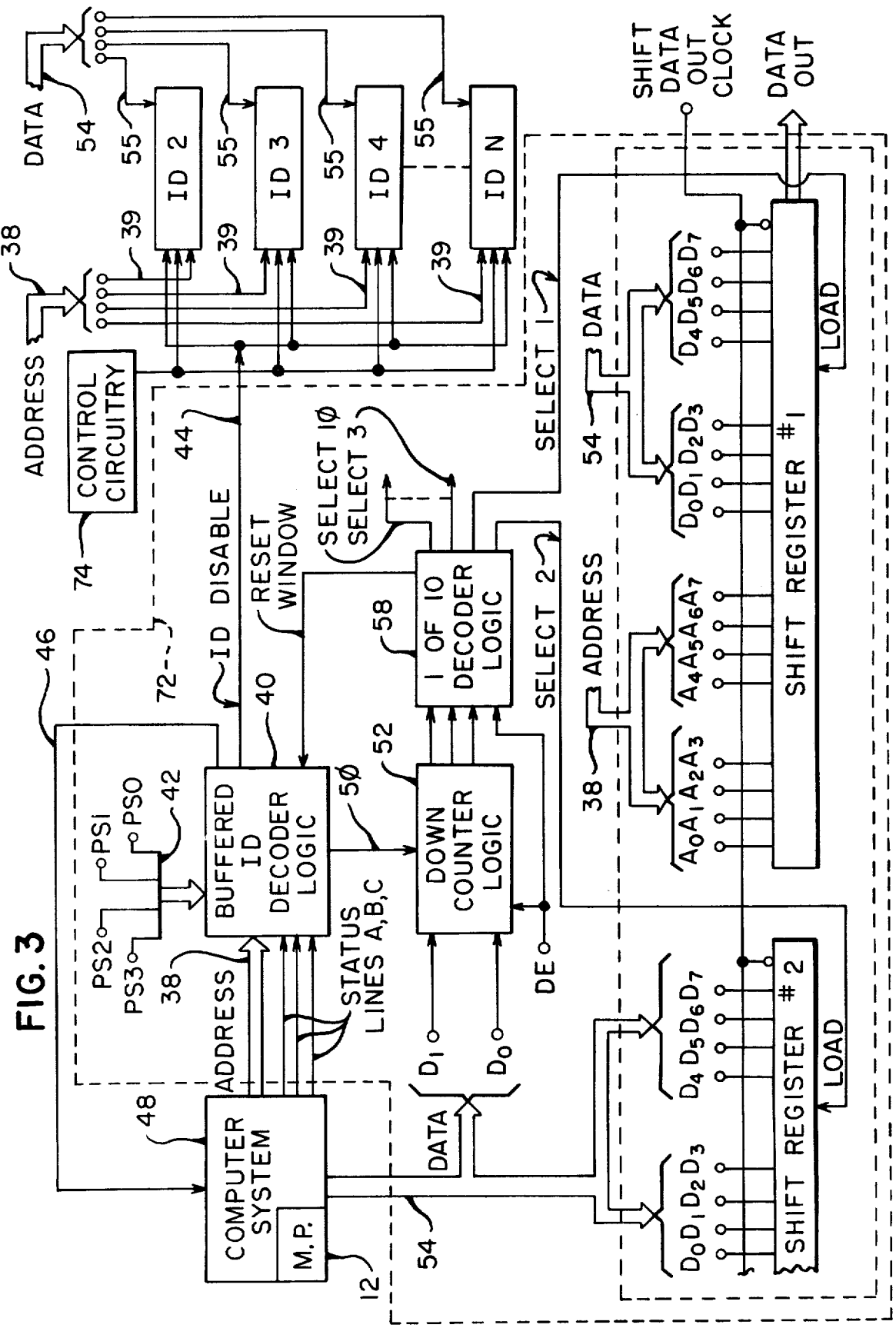
FIG. 3 is a block diagram showing the circuitry of this invention.

The decoder logic 40 may be conventional decoder circuitry which includes a plurality of integrated circuit chips, and line $5\phi$ therefrom is a counter enable line which enables conventional down counter logic 52 (FIG. 3). The logic equation for enable line $5\phi$ will be described later herein. The decoder logic 40 is buffered in that the ID disable line 44 (FIGS. 3 and 5) must be in a raised or high condition during the entire transfer or data or steps represented by the memory locations $XX\phi3$ through $X1\phi\phi$ shown in FIG. 4. The count or number of words to be transferred from memory location $XX\phi1$ (FIG. 4) is fed into the counter logic 52 via the data lines 54. Only two data lines $D_0$ and $D_1$ are shown entering the counter logic 52, as only this many lines are needed for the count of 3 words or the six bytes of data to be transferred in the specific example given in FIG. 4; however, additional data lines may be added for situations in which the count exceeds 3 words. The data lines 54 and address lines 38 are each eight bit lines which are of the common bus variety associated with the Intel 8080 microprocessor and are shown at various places in FIG. 3. Each of the lines 39 (FIG. 3) connected to the ID's 2, 3, 4 . . . n represents an 8-bit common bus address line, and similarly, the lines 55 represent 8-bit common bus data lines.

The DE line, (data enable) shown in FIGS. 3 and 5 and included in step 37 of FIG. 2, is a peripheral data strobe which is used to strobe the data from FIG. 4 into the particular selected output device or peripheral ID shown in FIG. 3. Reference may be made to "The Intel 8080 Microcomputer System Manual" mentioned earlier herein for a more detailed description of the various control pulses available for the microprocessor 12. The DE line is one of three status lines coming from the microprocessor 12 shown in FIG. 3. Status line A is a Peripheral Select Enable line which is high whenever the microprocessor 12 communicates with a peripheral or utilization device; ie. whenever it is executing input-/output instructions. Status line B is a Peripheral read, ie., it is the opposite of a write instruction to a peripheral. Status line C (data enable line DE) is a microprocessor generated signal which indicates when the data to be transferred is stable. The chain of pulses represented by the DE line in FIG. 5 may be indirectly derived from software input, output instructions and the microprocessor 12 as part of the entire computer system 48 (FIG. 3). The down counter logic 52 is loaded on the trailing edge 56 (FIG. 5) of the DE pulse when line 5$\phi$ is raised or enabled. The logic equation for enable line 5$\phi$ is shown on FIG. 5. The terms PS$\phi$, PS1, PS2, PS3 and PS4 associated with printed circuit board 42 (FIG. 3) are preselect hardwired codes located on the peripheral or utilization device and are selected at the time of the peripheral's design. The terms $A_\phi A_1$, $A_2$... are the address signals (from the microprocessor 12) that are generated from memory location XX$\phi$3. In the example given in FIG. 4, the count or number of words stored is 3, indicating that a first word consisting of the first and second bytes will be transferred to the selected output device as one word, and the second word consisting of the third and fourth bytes will be similarly transferred as the second word, etc. For example, with the down counter logic 52 loaded with a count of 3 words, a conventional 1 of 10 decoder logic 58 (FIG. 3) will provide a Select 1 pulse occurring at the trailing edge 60 of line DE (FIG. 5) to strobe or load the data appearing on the address lines 38 and data lines 54 (FIG. 3 and represented by step 39 in FIG. 2) into a 16-bit parallel to serial shift register #1. Note that at this time, the first data byte (from memory location XX$\phi$5 of FIG. 4) appears on the data lines 54 in FIG. 3, and the second data byte (from memory location XX$\phi$7 of FIG. 4) appears on the address lines 38 shown in FIG. 3.

Since the outputting of data under this invention must be contiguous, and since the counter is not equal to zero at this time (step 41 in FIG. 2), at the trailing edge 62 (FIG. 5) of a second pulse on line DE, the decoder logic 58 (FIG. 3) will produce a pulse on line Select 2 to strobe or shift out the second word into shift register #2 as represented by step 43 in FIG. 2. Shift register #2 is identical to shift register 190 1, so the third data byte (XX$\phi$9 of FIG. 4) will appear on the data lines 54, and the fourth data byte (XX$\phi$B of FIG. 4) will appear on the address lines (not shown) to shift register #2 (FIG. 3). The third data word consisting of the fifth data byte (XX$\phi$D of FIG. 4) and the sixth data byte (XX$\phi$F of FIG. 4) will appear on the data lines 54 and address lines 38, respectively, of a shift register #3 (not shown) and be strobed therein by a Select 3 pulse from the decoder logic 58 at the trailing edge 64 of a pulse on line DE (FIG. 5). Because the third data word of three data words has been outputted, the count on the down counter logic 52 will register a zero, as the counter logic 52 is decremented by each of the trailing edges 60, 62, and 64 of the pulses on line DE of FIG. 5.

Since the counter logic 52 (FIG. 3) is equal to zero (step 41 in FIG. 2), a return to start routine step 66 in FIG. 2 is initiated. The ID disable line to all non-selected output devices is dropped (step 68 of FIG. 2) on the trailing edge 64 of line DE (FIG. 5). A reset window pulse (FIG. 5) from decoder logic 58 (FIG. 3) also falls on the trailing edge 64 of line DE to reset the decoder logic 40. When the window reset pulse resets the decoder logic 40, the ID disable line 44 (FIG. 5) is also lowered to enable the sending of data to other output device or perhiperals. The outputting of the data under this invention is complete and the microprocessor 12 is returned to start (step 70 of FIG. 2) as also represented by memory location X1$\phi\phi$in FIG. 4.

In the embodiment shown in FIG. 3, the circuitry which is located within the dashed outline 72 is located at the peripheral or utilization device which in this instance is ID 1. Conventional control circuitry 74 is shown in FIG. 3 to enable these devices ID 2, ID 3 etc., to operate in a conventional mode with the computer system 48, and if some of these devices like ID 2, ID 3, etc. are required to operate in the special mode described herein, the control circuitry 74 for a required device may be replaced with circuitry similar to that already described and contained in dashed outline 72. Naturally, each additional utilization device while is to operate in the special mode described herein, would have its own selection code like that on printed circuit board 42, and would also have an ID disable line like 44 to disable the remaining non-selected utilization devices.

While this invention has been described as transferring words made up of two 8-bit bytes or 16-bits, if 3-½ such words are to be transferred, a count of 4 (words) is loaded into location XX$\phi$1 (FIG. 4) and the peripheral will be required to count the number of 8-bit (byte) groupings. This has to be done by the peripheral anyway for the correct number of clocked out bits.

The shift registers #1 and #2 shown in FIG. 3 and shift register #3 (not shown but identical to shift registers #1 and #2) represent the means for receiving the data at the selected utilization device like ID#1; however, these shift registers may be replaced by a conventional multiplexing means for receiving the data intended for the various utilization devices in FIG. 3. Because this aspect may be conventional, it is not described in any further detail. The data in the shift registers #1, #2, etc. may be outputted therefrom in conjunction with a shift Data Out Clock associated with the associated utilization device.

What is claimed is:

1. A method of increasing the output from an n bit processor to a plurality of utilization devices wherein said processor is interconnected to said utilization devices by n data lines and m address lines wherein n and m are whole integers, comprising the steps of:
   (a) forming data words having a length equal to n plus m data bits for data to be transferred to a selected one of said utilization devices and determining a count of said data words to be transferred;
   (b) selecting said utilization device which is to receive said data words and disabling the remaining non-selected utilization devices for a predetermined time interval;
   (c) entering said count on a counter means;
   (d) transferring said data words over said n data lines and m address lines during said predetermined time interval; and
   (e) ending said predetermined time interval when said count of data words to be transferred has been transferred to said selected utilization device.

2. The method as claimed in claim 1 in which said selecting step (b) also includes the step of dedicating said processor to said transferring step (d) until said count of data words has been transferred to said selected utilization device.

3. A processing system comprising:
   a processor;
   a plurality of utilization devices;

address lines and data lines operatively interconnecting said processor with said plurality of utilization devices;

means for storing data words and a count of said data words to be transferred to a selected one of said utilization devices over said address and data lines;

means for selecting one of said utilization devices and disabling the remaining non-selected said utilization devices for a predetermined time interval;

means for receiving said data words transferred over said address lines and said data lines during said predetermined time interval thereby increasing the output of said processor; said predetermined time interval expiring upon the completion of said count of said data words transferred to said selected utilization device.

4. The system as claimed in claim 3 in which said processor is an n bit processor which normally processes n bits of data and transmits n bits of data over n said data lines to a selected one of said utilization devices which is addressed by said address lines, said system including m said address lines wherein n and m are whole integers, and wherein said data words are made up of n plus m data bits.

5. The system as claimed in claim 4 in which said selecting means includes a counting means which causes said predetermined time interval to expire upon the completion of said count of data words which are transferred to said selected utilization device.

6. The system as claimed in claim 5 in which said processor is an 8 bit microprocessor having 8 said data lines and 8 said address lines operatively interconnected therewith, and said data words are made of 16 bits.

7. A processing system comprising:
an n bit microprocessor;
a plurality of utilization devices;
n data lines and m address lines operatively interconnecting said microprocessor with said plurality of utilization devices wherein n and m are whole integers;
means for storing data words and a count of said data words to be transferred to a selected one of said utilization devices wherein the length of each said data words is equal to n plus m data bits;
means for selecting one of said utilization devices and disabling all the remaining non-selected said utilization devices for a predetermined time interval;
means for receiving said data words transferred over said data lines and said address lines during said predetermined time interval; said predetermined time interval expiring upon the completion of said count of said data words transferred to said selected utilization device.

8. The system as claimed in claim 7 in which said selecting means includes a counting means upon which said count is registered to initiate the start of said predetermined time interval, and which said counting means terminates said predetermined time interval upon said count of said data words being transferred over said data lines and said address lines to said selected utilization device.

9. The system as claimed in claim 7 in which said selecting means comprises:
decode logic means for detecting when said system is to operate in a special mode;
counter means upon which said count is registered to initiate the start of said predetermined time interval for said special mode and which said counting means terminates said predetermined time interval upon said count of data words being transferred over said data lines and said address lines to said selected utilization device;
said decode logic means also producing an interrupt disable signal to dedicate said microprocessor during said predetermined time interval to the transference of said data words,
said counter means, upon completion of said count of data words being transferred to said selected utilization device, issuing a reset signal to terminate said special mode.

10. A processing system comprising:
an n bit microprocessor;
a plurality of utilization devices;
n data lines and m address lines operatively interconnecting said microprocessor with said plurality of utilization devices wherein n and m are whole integers;
means for storing data words and a count of said data words to be transferred to a selected one of said utilization devices wherein the length of each said data word is equal to n plus m data bits;
means for selecting one of said utilization devices and disabling all the remaining non-selected said utilization devices for a predetermined time interval;
means for receiving said data words transferred over said data lines and said address lines during said predetermined time interval; said predetermined time interval expiring upon the completion of said count of said data words 11. A circuit means for use with a processor for increasing the output of said processor to a plurality of utilization devices in which said processor is an n bit processor comprising:
n data lines and m address lines operatively interconnecting said processor with said utilization devices wherein n and m are whole integers;
means for storing data words and a count of said data words to be transferred to a selected one of said utilization devices wherein the length of said data words is equal to n plus m data bits;
means for selecting one of said utilization devices and disabling the remaining non-selected utilization devices for a predetermined time interval;
means for receiving said data words transferred over said data lines and same address lines during said predetermined time interval; said predetermined time interval expiring upon the completion of said count of said data words transferred to said selected utilization device.

12. The circuit as claimed in claim 11 in which said selecting means includes a counting means which causes said predetermined time interval to expire upon the completion of said count of data words which are transferred to said selected utilization device.

13. The circuit as claimed in claim 11 in which said selecting means comprises:
decode logic means for detecting when said system is to operate in a special mode;
counter means upon which said count is registered to initiate the start of said predetermined time interval for said special mode and which said counting means terminates said fixed predetermined time interval upon said count of data words being transferred over said data lines and said address lines to said selected utilization device;

said decode logic means also producing an interrupt disable signal to dedicate said processor during said predetermined time interval to the transferrence of said data words, said counter means, upon completion of said count of data words being transferred to said selected utilization device, issuing a reset signal to terminate said special mode.

14. A circuit means for use with a processor for increasing the output of said processor to a plurality of utilization devices in which said processor is an n bit processor comprising:

n data lines and m address lines operatively interconnecting said processor with said utilization devices wherein n and m are whole integers;

means for storing data words and a count of said data words to be transferred to a selected one of said utilization devices wherein the length of said data words is equal to n plus m data bits;

means for selecting one of said utilization devices and disabling the remaining non-selected utilization devices for a predetermined time interval;

means for receiving said data words transferred over said data lines and said address lines during said predetermined time interval; said predetermined time interval expiring upon the completion of said count of said data words transferred to said selected utilization device;

said selecting means comprising:

decode logic means for detecting when said system is to operate in a special mode;

counter means upon which said count is registered to initiate the start of said predetermined time interval for said special mode and which said counter means terminates said fixed predetermined time interval upon said count of data words being transferred over said data lines and said address lines to said selected utilization device; transferred to said selected utilization device;

said selecting means comprising:

decode logic means for detecting when said system is to operate in a special mode;

counter means upon which said count is registered to initiate the start of said predetermined time interval for said special mode and which said counter means terminates said predetermined time interval upon said count of data words being transferred over said data lines and said address lines to said selected utilization device;

said decode logic means also producing an interrupt disable signal to dedicate said microprocessor during said predetermined time interval to the transferrence of said data words, said counter means, upon completion of said count of data words being transferred to said selected utilization device, issuing a reset signal to terminate said special mode;

said counter means including a down counter, and said decode logic means being buffered, and said receiving means including parallel to serial shift register means.

said decode logic means also producing an interrupt disable signal to dedicate said processor during said predetermined time interval to the transferrence of said data words, said counter means, upon completion of said count of data words being transferred to said selected utilization device, issuing a reset signal to terminate said special mode;

said counter means including a down counter, and said decode logic means being buffered, and said receiving means including parallel to serial shift register means.

* * * * *